May 11, 1965
A. E. REISENAUER ETAL
3,183,059
PLUTONIUM ADSORPTION AND DESORPTION
Filed June 11, 1962
2 Sheets-Sheet 2
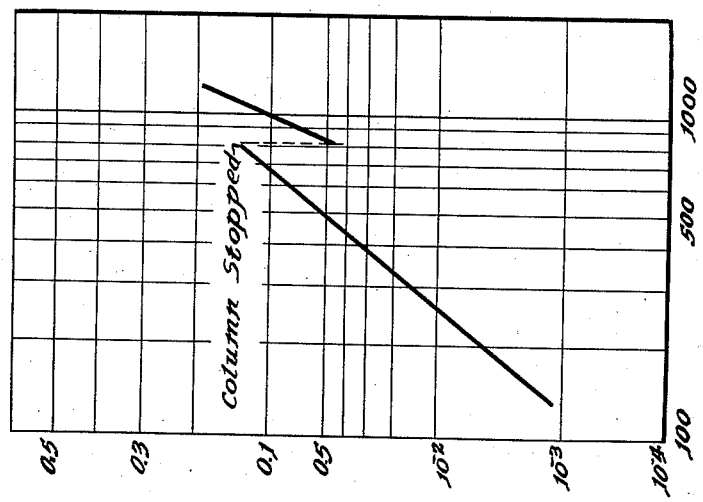
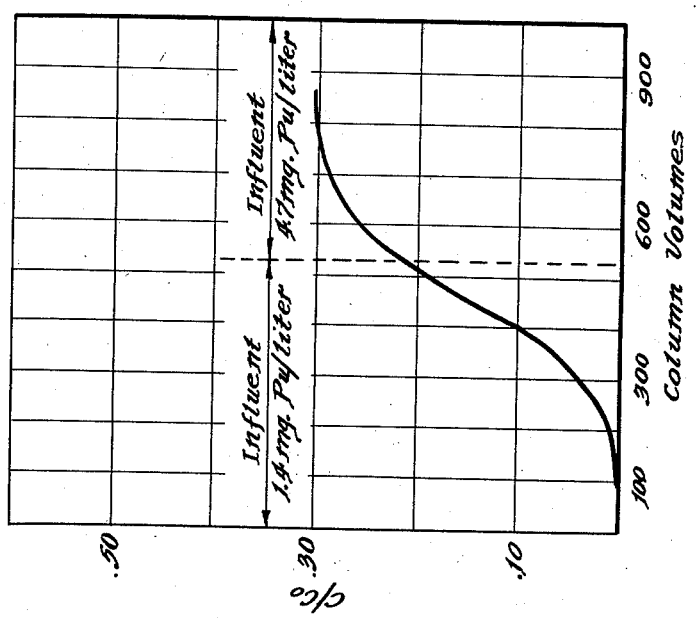
INVENTORS
Andrew E. Reisenauer
Lloyd L. Ames, Jr.
BY
Roland G. Anderson
Attorney

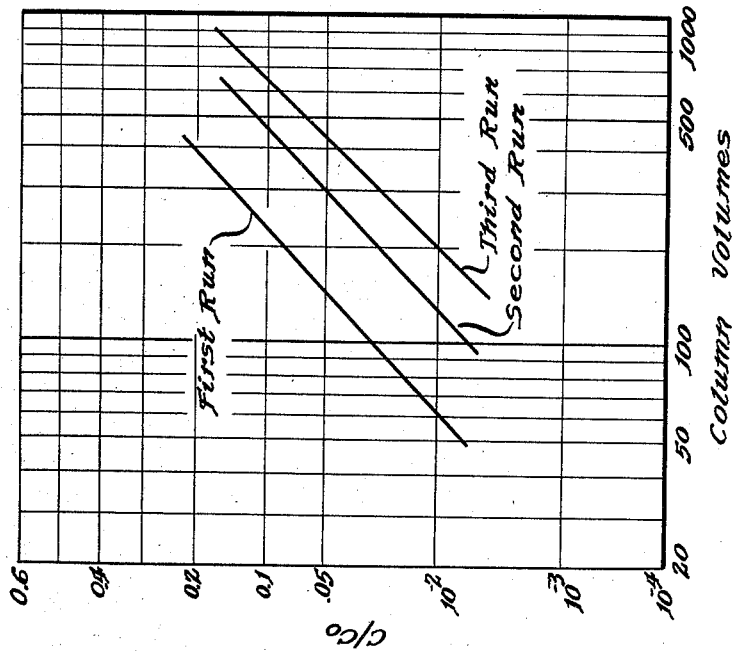
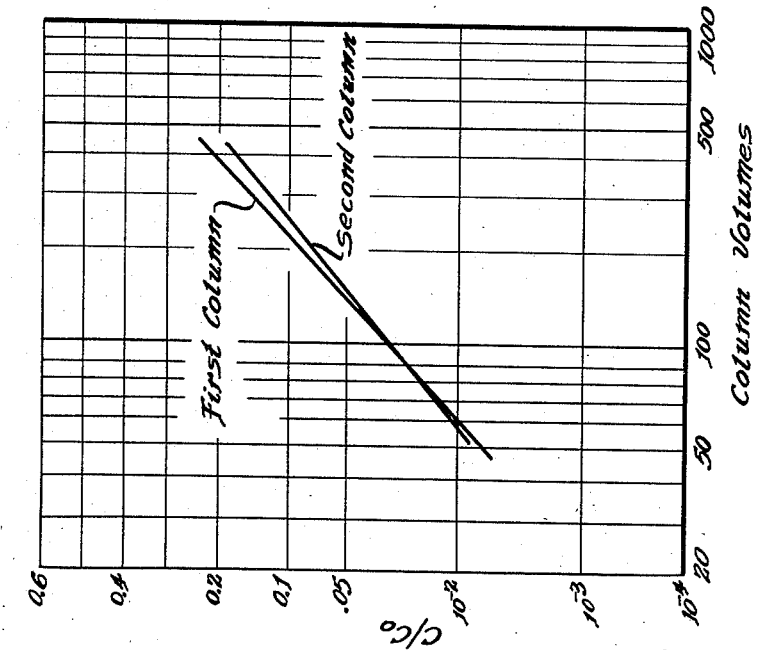

3,183,059
PLUTONIUM ADSORPTION AND DESORPTION

Andrew E. Reisenauer and Lloyd L. Ames, Jr., Richland, Wash., assignors to the United States of America as represented by the United States Atomic Energy Commission
Filed June 11, 1962, Ser. No. 202,046
3 Claims. (Cl. 23—14.5)

The invention relates to a novel method of extracting plutonium values from a solution by adsorbing them upon an adsorbent, desorbing them therefrom by novel eluents and regenerating the adsorbent; more particularly, to methods of carrying out such adsorption and desorption in case of emergency and in a cyclic adsorbent regeneration scheme.

Many methods have been developed for the removal of plutonium values from nuclear reactor reprocessing solutions. Liquid-liquid, or as it is also called, solvent extraction, ion exchange, selective precipitation, and chromatographic methods all have certain advantages and disadvantages. All of them, however, require rather expensive materials and apparatus for carrying them out, and they also require that certain conditions be known beforehand such as the quanity of the solution from which the extraction is to be made, the concentration of its plutonium values, the concentration of its other ionic species, and the like.

In emergency situations, such as when a spill occurs of a quantity of a solution containing plutonium, information of this kind is often not available, or not available quickly enough to enable personnel at the scene to make use of it. Likewise the specific material needed may not be available, or even if it is available, it may not be ready to use, such as an ion exchange resin requiring equilibration. Moreover, it is not possible to forecast in a fuel reprocessing facility the exact makeup of the solutions which will be handled at any future time; since nuclear reactors are not standardized, it is not economic to construct reprocessesing plants to reprocess one type of fuel alone. Hence, a versatile method of dealing with spills is needed using an adsorbent capable of taking up plutonium in many varied situations, especially where the plutonium-containing solution is quite acidic.

In case of a spill, the liquid tends to spread out over a large area, and since safety reasons require that all the plutonium be taken up regardless of cost, an amount of material vastly in excess of stoichiometric requirements is apt to be used. For all these reasons a method for taking up plutonium is needed making use of a comparatively cheap material; it should be cheap enough to be placed around the reprocessing facility at scattered locations for use in possible emergencies; it should not deteriorate in storage or require conditioning before use.

In addition to emergencies there are other situations where an economical method of adsorbing and desorbing plutonium is needed. The final waste solutions coming from an ion exchange column, a solvent extraction apparatus, or other kinds of equipment in which plutonium has been extracted, contain trace amounts of plutonium which, while not great enough to justify further treatment by established extraction methods, still should be removed for public health reasons.

Finally, it is desirable to develop a system of semi-continuous extraction of plutonium values reusing a cheap extractant, or adsorbent, through several cycles; in order to do this, a method of regenerating the adsorbent is essential.

It is, accordingly, the general object of the invention to provide a method for adsorbing plutonium values on an adsorbent from a solution and of desorbing the values from the adsorbent.

It is a more particular object to provide such a method which is versatile and which may be carried out with cheap materials capable of being stored for indefinite periods without deterioration and requiring no conditioning previous to use.

It is another particular object to provide an economical method of removing trace amounts of plutonium remaining in solution after other plutonium extraction methods have been carried out.

It is another object to provide a method of extracting plutonium from solutions which are quite acidic.

It is another object to provide a method for regenerating an extractant, or adsorbent for plutonium values, thereby making reuse of adsorbent possible in a cyclic scheme of semi-continuous extraction.

The foregoing objects are attained by our discovery that Florida apatite has the requisite chemical and physical characteristics to make it a cheap and efficient adsorbent for plutonium values even from acidic solutions, and that these may be simply desorbed from such apatite by carbonate ion or by strong mineral acids.

Apatite is a broad term covering naturally occurring minerals which are predominantly calcium phosphate, but not all apatites have the requisite characteristics for a plutonium adsorbent. The Florida variety is a basic salt with the formula $Ca_5(PO_4)_3(OH,F)$. It has a porous physical structure with a surface area, as established by a standard gas adsorption method, of about 13.7 square meters per gram for a particle size of 0.124 to 0.250 mm. Canadian apatite, as established by the same method and the same particle size, has a surface area of only 0.01 square meter per gram and cannot be used for the invention. We have found our invention to be operable only when the apatite, or other predominantly calcium phosphate mineral used, has a surface area of the same order of magnitude as Florida apatite, or at least 10 square meters per gram. For convenience, any mineral meeting these requirements will be referred to as FA, which will be taken to include operative apatites whether their actual geographical origin is in the State of Florida or not. We are inclined to believe that it is the physical structure of FA that makes it uniquely suitable for practicing the invention in addition to its chemical properties; however, we do not wish to be rigorously bound by this or any other theory, and our invention is offered on the basis of our empirical findings, based on actual experiments.

Commercially available Florida apatite or other FA for practicing the invention should be subdivided sufficiently to permit the solution under treatment to have access to the large surface area on which adsorption of the plutonium values take place. What is spoken of as "pebble apatite" is suitable; "pebble apatite" is a generic term referring to certain calcium phosphates that have radially crystallized about a center, and occur as "pebbles" from two inches to 150 mesh in diameter. It is preferably used in the size range of about .0124 to 1.0 mm. It may be brought into contact with the solution containing plutonium values in any suitable manner, by shaking in a closed vessel, contacting in a column, or, in the case of a spill emergency, spreading it in the area covered by the spilled solution.

The plutonium values may be in any form as they occur in waste solution, either as plutonium ions or plutonyl ions. The solution, of course, has to be sufficiently acidic to prevent precipitation of such values as aluminum in the waste solution, but otherwise is operable over a large range of pH including those below 7. Neither does our method depend on the particular anions present in the solution; these may be chloride, sulfate, nitrate, or of any other similar anions. As stated above, one of the outstanding advantages of our invention is its versatility in adsorbing plutonium values from many different kinds of solutions, of many different concentrations, acidities and ionic strengths.

Attention is now directed to the drawings, FIG. 1 of which is a logarithmic-probability graph showing column volumes of solutions passed through a first column and a second column of FA of 0.124 to 0.250 mm. particle size as abscissae, and the ratio of the concentration of plutonium values in the effluent solution (C) from the columns to the concentration of plutonium values in the influent solution ($C_0$) into the columns.

FIG. 2 is a graph similar to FIG. 1 showing the same information with respect to the first column from FIG. 1 on "reloading," or running additional portions of fresh influent solution of the same makeup through the column in these successive "runs."

FIG. 3 is a graph similar to FIGS. 1 and 2 showing the same information for a fresh, somewhat longer column into which the concentration of the plutonium in the influent solution was suddenly changed.

FIG. 4 is another graph similar to the other graphs showing the effect of interrupting the flow of the influent solution into a column of the same kind.

We have found that FA, by reason of its combination of physical and chemical properties, has such a selective affinity for plutonium values that once they have been adsorbed by it they are difficult to remove by conventional regenerative methods used for ion exchange resins, zeolites and the like. The conventional method is to wash the ion exchange material, or adsorbent material, with competing ions of the same general character, such as when calcium ions are eluted from zeolite by sodium ions in the familiar case of water softeners.

Since conventional regenerative methods are not effective it first appeared that our invention would be confined to rather limited applications where the FA adsorbent could be used only once and then discarded. However, we have made the further discovery that FA may be regenerated on a different principle, by washing it with a carbonate such as sodium carbonate, ammonium carbonate, potassium carbonate, and other alkali and soluble carbonates. This appears not merely to exchange one ion for another on the adsorbed surface, but actually to break down the outer structure of the FA particles and coat them with a thin calcium carbonate layer, possibly only a few microns thick. Since calcium carbonate has no strong affinity for plutonium values the latter are readily washed away and the apatite is substantially freed of them. The particles of FA may then be returned to their original state by washing them batchwise or in a column with a solution containing phosphate ions which exchanges, in conventional regeneration fashion, its phosphate ions for the carbonate ions in the layer referred to. For this purpose a solution may be used of a member of the class consisting of the alkali phosphates, ammonium phosphates and other soluble phosphates, primary, secondary and tertiary. Of these $Na_2HPO_4$ is preferred.

We have found that the novel two-step regenerative method just described has an important time limitation. It operates perfectly if the contact by the carbonate with the FA is made promptly after it adsorbs the plutonium, but less so with the lapse of time. After three days only about 10 percent may be removed in this way, and strong acids such as 6 N $HNO_3$ must be used to recover the balance, which only goes to illustrate the strength of FA's affinity for plutonium values and the great convenience of our novel regenerative method.

An explanation has been offered explaining the operation of our novel two-step regenerative method. It is reasoned that the plutonium values are first adsorbed by the FA in localized areas, after which they diffuse along its crystal boundaries so that after a period of time when the carbonate layer is formed by contact with carbonate ions the layer is too superficial to affect the diffused plutonium. While this theory appears to be logical, we do not, of course, wish to be rigorously bound by it, and again this aspect of our invention is offered on the basis of our empirical findings, based on actual experiments which will be set forth. Our discvoery makes possible a cyclic scheme of "reloading" as will also be shown.

A column packed with Florida pebble phosphate was found to adsorb significantly large quantities of plutonium from a plutonium-containing acidic waste solution which was passed through the column. Approximately 90% of the plutonium was adsorbed on the phosphate mineral bed from the first 400 column volumes of waste passed through the bed at a flow rate which provided a residence time of 1.4 minutes. Table I shows the plutonium loading of the pebble phosphate column and other conditions, and results observed.

TABLE I

| Column volumes throughput | Percent of Pu not adsorbed | Pu decontamination factor | Accumulated mg. of Pu adsorbed on apatite |
| --- | --- | --- | --- |
| 12.2 | 0.2 | 4,170 | .094 |
| 76.7 | 2.2 | 45 | .587 |
| 123.5 | 2.0 | 45 | .944 |
| 149 | 3.8 | 26 | 1.138 |
| 216 | 13.2 | 7.6 | 1.638 |
| 276 | 12.9 | 7.7 | 2.080 |
| 363 | 19.9 | 5.0 | 2.717 |
| 415 | 22.8 | 4.4 | 3.097 |

Influent, acid waste—pH 2.85.
Flow rate—1.04 gal./ft.$^2$/ min.
Residence time—1.36 min.
Temperature—27° C.
Column—0.25 to 1.0 millimeter Florida pebble phosphate.
Column diameter—1 cm.
Column volume—11 ml.
Column length—14 cm.
Plutonium concentration in influent—.735 mg./liter.

Recovery of the plutonium was accomplished by passing an elution solution of 1 M $Na_2CO_3$ through the column. The eluent solution was tested for plutonium on a cumulative basis from time to time, and the results were as follows.

TABLE II

| Cumulative eluent in column volumes | Plutonium cumulative, mg. | Percent of adsorbed Pu removed |
| --- | --- | --- |
| 1.09 | 1.500 | 48.4 |
| 1.59 | 2.144 | 69.1 |
| 2.14 | 2.700 | 87.0 |
| 2.77 | 2.807 | 90.6 |
| 4.23 | 2.896 | 93.1 |
| 5.40 | 2.933 | 94.5 |
| 6.59 | 2.952 | 95.5 |

Influent—1 M $Na_2CO_3$.
Influent—pH 10.5.
Flow rate—0.68 gal./ft.$^2$/min.
Residence time—2.07 min.
Temperature—27° C.

The same pebble phosphate column was then eluted with about ten column volumes of 0.1 M $Na_2HPO_4$. As explained above this removed the thin layer of calcium carbonate from the apatite particles and completed the regeneration of the adsorbent. Its efficiency in a second cycle of plutonium extraction was then tested by passing the same plutonium-containing waste solution through the column, with these results.

TABLE III

| Column volumes throughput | Percent of Pu not adsorbed | Pu decontamination factor | Accumulated mg. of Pu adsorbed on apatite |
|---|---|---|---|
| 45.5  | .02  | 5,000 | .370 |
| 55.5  | .04  | 2,500 | .449 |
| 212   | 5.03 | 20    | 1.656 |
| 247   | 6.17 | 16    | 1.921 |
| 262   | 7.15 | 14    | 2.030 |
| 288   | 7.90 | 13    | 2.228 |
| 425   | 10.4 | 10    | 3.221 |
| 660   | 17.3 | 6     | 4.777 |
| 680   | 14.5 | 7     | 4.921 |

Influent, acid waste—pH 2.85.
Flow rate—0.57 gal./ft.²/min.
Residence time—2.67 minutes.
Temperature—27° C.
Column—the same as used in Tables I and II.
Plutonium concentration in influent—.735 mg./liter.

As can be seen by comparing Table III with Table I the apatite gained in efficiency on the second cycle of plutonium extraction.

Example I

The first of a series of experiments, the later members of the series being described in the succeeding examples, were run with columns of one centimeter diameters of various lengths, or depths. All experiments were performed at ambient temperature near 27° C. using pebble FA sized to less than 1.00 mm. and greater than 0.25 mm. The influent solutions in all experiments were nuclear reactor waste solutions, or "sump waste" having concentrations of plutonium values varying from 0.74 to 0.40 mg. Pu/l., condensate water, cooling water, dilute HF from a fluorinator, and neutralized caustic from a recuplex dissolver scrubber.

In the first of the series of experiments, with which this example is concerned, two columns 14 cm. long with column volumes of 11 cm., containing 18.5 g. of pebble FA, were loaded with plutonium values adsorbed from the sump waste which was passed through the columns at a flow rate of 4.2 ml./min./cm.². The plutonium breakthrough data was recorded in the graph of FIG. 1 with column volumes as abscissae and the ratio $C/C_0$ as ordinates. The influent contained 0.74 mg. Pu/l. and had a pH of 2.1; passage was made of 4.6 liters, or 415 column volumes; residence time was 1.4 min. After one run in each column the columns were found to contain 3.11 and 3.06 mg. of plutonium respectively. Thus about 91.5 and 90.2 percent of the plutonium values were removed from the influent solution by the FA in the respective columns.

The apparent discrepancy between these percentages and the $C/C_0$ values shown in the graph of FIG. 1 is to be explained by the "holdup" of the solution itself by the material of the columns; this makes the value of "C" higher than would be the case if drainage were complete. In any event, the graph clearly shows that FA is an efficient adsorbent with an adsorbent capacity for plutonium values from a solution of the rather low pH of 2.1.

Example II

The first of the columns used in Example I was eluted with $Na_2CO_3$ and reloaded with the same solution twice, or, in other words, the column was operated through three cycles, or runs. All conditions were the same in the last two cycles as the first except that the flow rate in these was 2.33 ml./min./cm.², and the residence time 2.7 min.

In FIG. 2, a graph of the data obtained in this example, will show that the adsorption capacity of the FA appears to improve with cycling, a further advantage of this material.

In the elution of the column 1, molar $Na_2CO_3$ was used as the eluent. The cumulative eluent was tested to its plutonium content at various stages with the results which are tabulated below in Table IV:

TABLE IV
ELUTION OF RECYCLE COLUMN WITH 1 M $NA_2CO_3$

| Cumulative eluate (column volumes) | Plutonium recovered (mg.) | Adsorbed plutonium recovered (percent) |
|---|---|---|
| First elution | Flow rate, 2.33 ml./min./cm.² | |
| 1.1 | 1.50 | 48 |
| 1.6 | 2.14 | 69 |
| 2.1 | 2.70 | 87 |
| 2.8 | 2.81 | 91 |
| 5.4 | 2.93 | 94 |
| Second elution | Flow rate, 2.33 ml./min./cm.² | |
| 1.0 | .206 | 4.0 |
| 2.0 | .394 | 7.7 |
| 3.0 | .507 | 9.8 |
| 4.0 | .462 | 11.0 |
| Third elution | Flow rate, 1.1 ml./min./cm.² | |
| 1.2 | .482 | *4.5 |
| 2.2 | .714 | 6.7 |
| 3.2 | .831 | 7.8 |
| 4.0 | .879 | 8.3 |
| 4.8 | .921 | 8.7 |
| 6.0 | .964 | 9.1 |

*Percent removed calculated from Pu accumulated on the column through the second and third loading cycles.

The foregoing clearly illustrates the effectiveness of our novel method of regeneration.

Example III

To determine the effect of a sudden change in influent plutonium concentration a 17 cm. column was operated at a flow rate of 2.33 ml./min./cm.². After passage of 540 column volumes the original influent of 1.4 mg. Pu/l. was suddenly increased to 4.7 mg. Pu/l. This column contained 24 g. of FA and the pH of the influent solution was 2.8; otherwise conditions were the same as in the previous examples; the data found was plotted in the graph of FIG. 3.

It will be noted that the changes in $C/C_0$ shown in the graph of FIG. 3 just before and after the concentration increase fit a smooth S-shaped curve. This tends to show the affinity of FA for plutonium over a longer range than is shown in FIGS. 1 and 2, but in no way contradicts them.

*Example IV*

A column 47 cm. long with a column volume of 37 ml. was loaded with a sump waste influent having 0.66 mg. Pu/l. and a pH of 2.1 at a flow rate of 6.4 ml./min./cm.$^2$. The residence time in the column was 3.25 min.

At about 525 column volumes the flow of solution was stopped and resumed after an interruption of 72 hours. The data recorded was plotted in the graph of FIG. 4.

It will be observed that not only did the column lose no capacity due to the interruption, but actually improved. This is another unexpected advantage of the invention caused by diffusion of adsorbed plutonium into the interior of the phosphate pebble, thereby making adsorption sites near the surface available.

Based on the data gained from the foregoing examples, a cyclic adsorption and desorption process appears to be feasible.

It is to be understood that the invention is not to be limited to the details given herein but that it may be modified within the scope of the appended claims.

What is claimed is:
1. A method of desorbing plutonium values adsorbed on a porous predominantly calcium phosphate solid, comprising contacting the same with a solution containing carbonate ions sufficiently to form a thin layer of calcium carbonate on the surface of the predominantly calcium phosphate solid; and to elute the layer of the plutonium values.

2. A method of regenerating a porous predominantly calcium phosphate solid having plutonium values adsorbed on its surface, comprising contacting it with a solution containing carbonate ions sufficiently to form a thin layer of calcium carbonate on its surface and to immediately elute the layer of plutonium values, and contacting the layer with a solution containing phosphate ions sufficiently to reconvert the layer to calcium phosphate.

3. A cyclic method of semicontinuously removing plutonium values from a plutonium-containing solution, comprising passing the solution through a column packed with Florida apatite of from about 0.25 mm. to 1.00 mm. particle size until the concentration of the effluent from the column reaches the upper limit of acceptable plutonium concentration, passing a solution containing carbonate ions through the column for a time sufficient to form a thin surface layer of calcium carbonate on the surface of the apatite particles and to elute the plutonium values from the column, passing through the column a solution containing phosphate ions sufficiently to reconvert the thin layer of calcium carbonate to calcium phosphate, thereby completing a single cycle, and then repeating such cycles a sufficient number of times to extract substantially all the plutonium values from the plutonium-containing solution.

References Cited by the Examiner

UNITED STATES PATENTS 2,766,204  10/56  Lowe _____ 23—14.5
2,859,093  11/58  Russell et al. _____ 23—14.5

OTHER REFERENCES

AEC Document, HW–70050, January 1961, pp. 143–219, abstracted in Nuclear Science Abstracts, vol. 17, No. 1177.

Ames et al.: Peaceful Uses of Atomic Energy, vol. 18, pp. 76–81 (1958).

Biochemistry (USSR), 23, 528–31 (1958), abstracted in Nuclear Science Abstracts, vol. 13, No. 9574.

CARL D. QUARFORTH, *Primary Examiner.*